United States Patent [19]

Grant

[11] Patent Number: 4,702,594
[45] Date of Patent: Oct. 27, 1987

[54] DOUBLE EXPOSURE INTERFEROMETRIC ANALYSIS OF STRUCTURES AND EMPLOYING AMBIENT PRESSURE STRESSING

[75] Inventor: Ralph M. Grant, Rochester, Mich.

[73] Assignee: Industrial Holographics, Inc., Auburn Heights, Mich.

[21] Appl. No.: 441,719

[22] Filed: Nov. 15, 1982

[51] Int. Cl.⁴ ...................... G01B 9/025; G01B 11/16
[52] U.S. Cl. .................................. 356/35.5; 356/348
[58] Field of Search ................. 356/32, 35.5, 347, 348

[56] References Cited

U.S. PATENT DOCUMENTS

| | | | |
|---|---|---|---|
| 3,828,126 | 8/1974 | Ramsey, Jr. | 356/32 X |
| 3,911,733 | 10/1975 | Bhuta et al. | 356/35.5 X |
| 4,139,302 | 2/1979 | Hung et al. | 356/32 |

Primary Examiner—Vincent P. McGraw
Attorney, Agent, or Firm—Krass & Young

[57] ABSTRACT

In order to detect subsurface defects in a vehicle tire the tire is placed in a sealed pressure chamber and the pressure is rapidly reduced to a very low level, and maintained at that level for a period of time. The body of the tire creeps for a period of time following the pressure change as a result of the stresses imposed by the pressure change. During this creep period a section on the surface of the tire is illuminated with coherent light and two separate exposures of interferograms are made using the reflected light and recorded on either a photographic media or the cathode of a television image tube. The exposure may either be holographic, in which case the interferogram is produced by using a reference beam of light derived from the same source that illuminates the object surface, or shearography, in which case two focused images of the tire surface section are formed on the photosensitive media, displaced with respect to one another and overlapping one another. The resultant hologram or shearogram is processed in the normal manner to derive an image of the object surface containing fringes arrayed as a function of the deformation of the surface between the two exposures. These fringes are analyzed either by a computer or an operator, to detect anomalous fringe families related to subsurface defects in the tire section.

4 Claims, 4 Drawing Figures

DOUBLE EXPOSURE INTERFEROMETRIC ANALYSIS OF STRUCTURES AND EMPLOYING AMBIENT PRESSURE STRESSING

DESCRIPTION

1. Background of the Invention

This invention relates to double exposure interferometric methods such as holography or shearography for analyzing articles for structural defects and more particularly to a method of analyzing elastomeric objects such as vehicle tires by making a sudden change in their ambient pressure and forming the two exposures at spaced periods after the pressure change to detect deformation resulting from creep of the objects.

2. Prior Art

Double exposure holography is a method of analyzing the deformation of an object surface between the times of the two exposures involving forming a first hologram on a photosensitive media by exposing the media to an object beam of coherent light reflected from the object surface and a reference beam of coherent light derived from the same source used to illuminate the object. If the photosensitive media were processed following the formation of this first exposure to form a hologram and then illuminated with a reconstructing beam of coherent light comparable to the reference beam used during the formation of the hologram, an image of the object surface would be reconstructed. When a second exposure of the object surface is made before the hologram is developed the reconstructed image of the object surface will contain fringe families arrayed as a function of the deformation of the surface between the two exposures because of the interference between the two holograms. This highly sensitive technique for detecting surface deformation can be used for nondestructive testing by stressing the object as by mechanically loading or heating it during the period between the two exposures. The fringe families will then reveal the deformation of the surface resulting from the stress and can be used to detect defects or structural anomalies in the test object which influence the surface deformation. Subsurface voids or discontinuities in structural members can be detected in this way.

This technique of double exposure holographic interferometry is disclosed in U.S. Pat. No. 4,139,302. Other double exposure interferometric techniques involving the formation of two interferograms on the same light sensitive media are similar to double exposure holographic interferometry but present various advantages and disadvantages compared to that technique. This includes shearography as disclosed in U.S. Pat. No. 4,139,302 and speckle interferometry as disclosed in U.S. Pat. No. 3,816,649.

These techniques for industrial nondestructive testing have been used to analyze tires for subsurface defects employing a pressure chamber to load the tire by modifying its ambient pressure. In this method a first exposure is made at atmospheric pressure and then the pressure in the chamber is reduced, by drawing air out of the chamber and a second exposure is made. While commercially successful, the speed with which this process may be performed is limited by the time required for the system to return to a stable condition after moving to accommodate the changes in stress resulting from the pressure change. Additionally, problems are encountered in separating the fringes that result from anomalous deformation of the test object and are indicative of defects, from those fringes that result from overall motion of the object as a result of the pressure change. The fringe patterns are also somewhat masked by fringe generating noise that results from the difference in the refractive properties of the optical path during the two pressure changes as a result of the difference in air content of the atmosphere within the chamber at the two exposures.

SUMMARY OF THE INVENTION

The present invention is directed toward a unique method of performing double exposure interferometric non-destructive testing which alleviates these problems, resulting in a faster process producing a display that highlights the anomalous fringe patterns.

Broadly, the present invention relates to the method of double exposure interferometric analysis in which an appreciable change is made on the ambient pressure surrounding the test object and then the two exposures are quickly made, while the object is still undergoing creep as a result of the pressure change.

This method eliminates the need for allowing mechanical settling time between the two exposures, makes both exposures with substantially the same ambient pressure within the chambers so that differences in the refractive index of the optical path cannot mask the interference fringes, and allows the use of a relatively high vacuum or positive ambient pressure so that the system is firmly stressed and anomalous deformations associated with structural differences are pronounced.

The inventive method allows the pressure to be sharply reduced, to produce a relatively long period of creep after the reduction, so that a series of double exposure interferograms may be formed on separated areas of an item being tested following the reduction, without altering the pressure between successive exposures. This substantially decreases the time required to perform an interferometric analysis of a relatively large article, such as a vehicle tire.

The method of the present invention can be used with any of the double exposure interferometric analysis techniques, such as holographic shearography or speckle interferometry and allows use of photographic media or electronic recording arrangements of the type illustrated in U.S. Pat. No. 3,816,649.

Other objectives, advantages and applications will be made apparent by the following detailed description of several embodiments of the invention. The description makes reference to the accompanying drawings in which.

Figure 3:
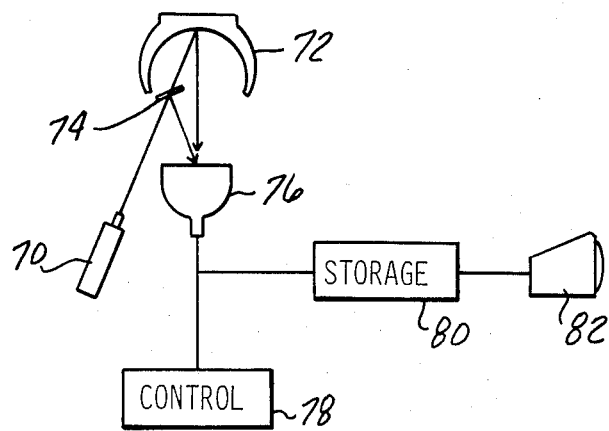
Figure 4:
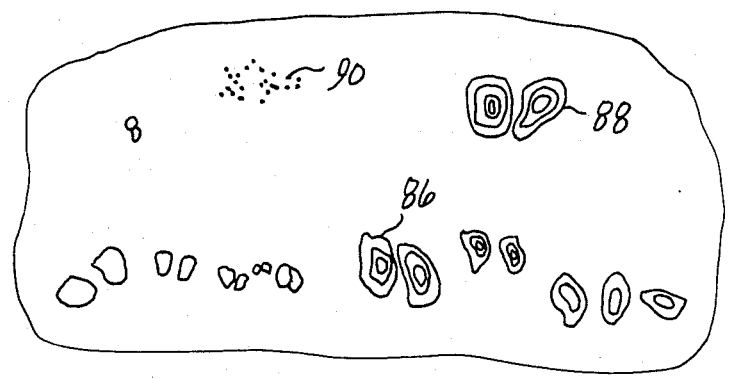

FIG. 3 is a schematic diagram of a shearographic test apparatus for use in connection with the present invention employing electronic recording of the interferogram; and FIG. 4 is an illustration of an image of a portion of a test object, as produced using the method of the present invention, illustrating interference fringes resulting from anomalous deformation of the object between the two exposures of the process.

Figure 1:
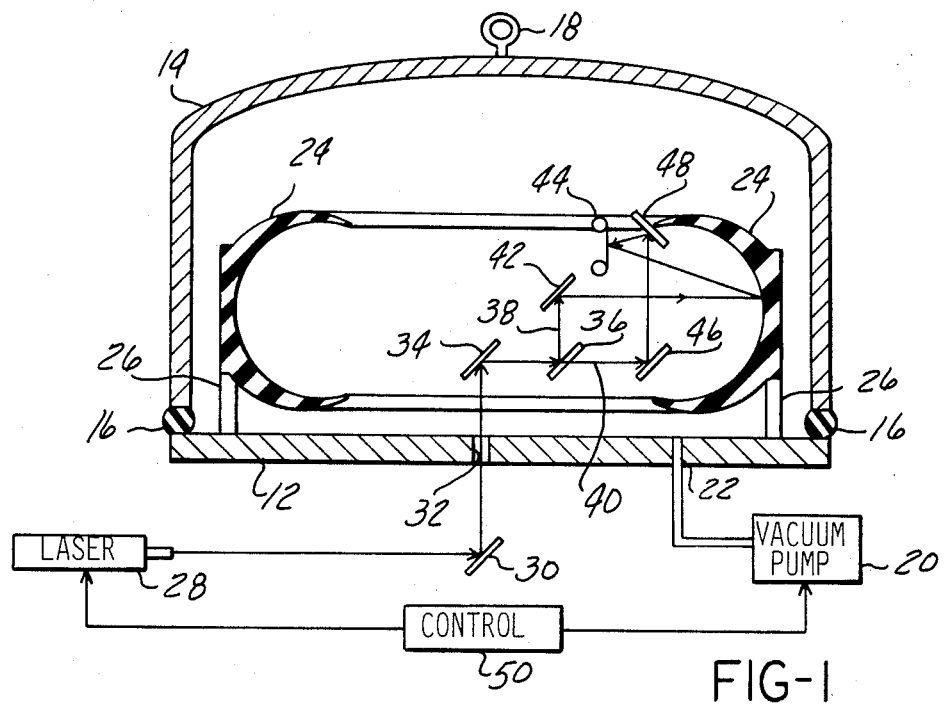
FIG. 1 is a schematic drawing of a vacuum test chamber containing holographic interferometric apparatus for practicing the present invention to analyze a rubber vehicle tire.

Referring to FIG. 1, a preferred embodiment of apparatus for the practice of the present invention employs a vacuum chamber consisting of a planar base member 12 and a rigid dome 14 which may be lifted into and out of position over the base member. A resilient annular sealing member 16 is affixed to the lower edge of the dome and forms a pressure-tight seal against the upper surface of the base when it is in contact with the base. A ring 18 affixed to the top of the dome allows it to be lifted by suitable material handling apparatus.

A vacuum pump 20 is connected to the interior volume within the base and dome by an aperture 22 that passes through the base. The vacuum pump can thus control the ambient pressure within the chamber.

The object to be non-destructively tested within the chamber is illustrated as a rubber vehicle tire 24, supported on the base by suitable brackets 26. Coherent light for the practice of the holographic interferometric analysis is derived from a laser 28, preferably supported exteriorly of the chamber. The light beam from the laser is reflected by a mirror 30 through a solid window 32 formed in the base to a holographic camera apparatus supported on the upper surface of the base. A camera apparatus includes a mirror 34 that reflects the vertically aligned beam from the mirror 30 in a horizontal direction. The horizontal beam passes through a beam splitter 36 that divides the beam into a vertical component 38 and a horizontal component 40. The vertical beam is reflected by a diffuse reflector 42 at an interior section of the tire to illuminate an area of the tire. Light from the tire is reflected to a section of holographic film 44 which records the hologram. The reference beam for the holographic exposure is derived from the horizontal beam 40 emanating from the beam splitter 36. The beam 40 is reflected upwardly by a mirror 46 and then downwardly onto the film 44 by a diffuse reflecting mirror 48.

A central control system 50 connects to both the laser 28 and the vacuum pump 20 to coordinate the operation of the system.

As heretofore described, this interferometric analysis apparatus is substantially conventional. The present invention lies in the unique method of utilizing the apparatus to perform an analysis. In accordance with the prior art a typical double exposure was made with the first exposure at zero vacuum and at atmospheric pressure and with the second exposure after the pressure has been reduced to approximately three inches Hg. The pressure change is usually made over approximately ten seconds so as to avoid inducing any strong impulses on the system and the system is allowed to settle for five to ten seconds after the pressure has been reduced, before the second exposure is made.

In the method of the present invention the pressure is altered sharply and quickly so as to induce a prolonged period of creep following the pressure change. In a preferred embodiment of the invention, vacuum is drawn from atmospheric to ten inches Hg in one second. Two or more exposures are then made in rapid sequence following the pressure change. The exact timing of the exposures will depend on the specific nature of the test article and the nature of the pressure change. In the case of a conventional truck tire it has been found that following a pressure reduction from atmospheric to ten inches Hg in one second, a first exposure may be made two seconds following the pressure change and a second exposure five to ten seconds after the pressure change.

It has been determined that successive double exposures may be made of other tire sections without again changing the pressure, if they are made rapidly enough. In the case of the truck tire, it has been determined that there is no appreciable creep after forty seconds from the pressure change. Thus, a series of double exposures may be made during the forty second period.

In alternative embodiments of the invention the pressure change could be in a positive direction, either from a vacuum to atmospheric pressure, or given suitable apparatus, from atmospheric to a positive pressure.

Figure 2:
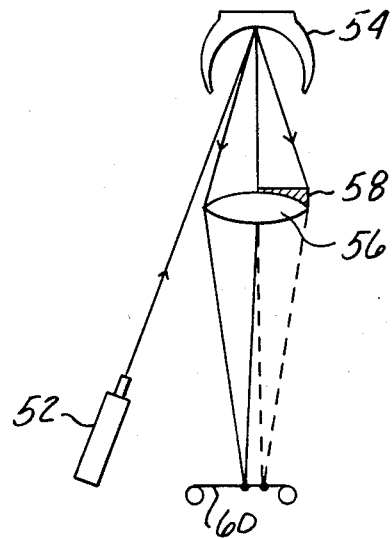
FIG. 2 is a schematic diagram of double exposure shearographic apparatus for the practice of the present invention.

The present invention may be practiced using other double exposure interferometric techniques other than holography. FIG. 2 schematically illustrates the apparatus which could be used to practice shearography employing the method of the present invention. The shearography process is disclosed in U.S. Pat. No. 4,139,302. The apparatus of FIG. 2 is disposed within a pressure chamber which may be of the type disclosed in FIG. 1.

A laser 52 generates a coherent light beam that illuminates a section of an object 54 being analyzed. Coherent light reflected from the illuminated section is passed through a lens 56 having one-half of its surface covered by a transparent optical wedge 58 to produce a pair of focused images, slightly separated and overlapping, on a photographic media 60. The two exposures are made in this manner at separated times, during the creep, using pressures and times similar to those employed with the apparatus of FIG. 1, and the image is then processed in the manner disclosed in U.S. Pat. No. 4,139,302, including high frequency spatial filtering of the resulting image, to generate an image of the object containing fringe families arrayed as a function of the anomalous deformation of the object between the two exposures.

FIG. 3 schematically illustrates apparatus for practicing the present invention involving an electronic recording of the interferogram as an alternative to the photographic recording of FIGS. 1 and 2. Again the apparatus is employed in a pressure chamber of the type illustrated in FIG. 1, using similar times and pressures.

A laser 70 illuminates the test object 72 with a beam that is passed through a half-silvered mirror 74. The mirror reflects a portion of the beam toward the cathode of a television imaging tube 76 such as a Vidicon or a rectangular photosensitive semiconductor array. The imaging device also receives an object beam reflected from the object and records the pattern of interference between the two.

A control system 78 for the imaging device prevents read-out of the first interferogram, stored as an electronic latent image on the photosensitive surface, following the first exposure. A second exposure is then made during the creep period, a few seconds after the first exposure, and the latent image on the imaging device 76 is altered to produce a pattern which represents interference between the interference patterns of the first and second exposures. This pattern is relatively gross in detail and can be typically read out on a Vidicon or an imaging array. The control 78 is then energized to cause read-out of the tube to a suitable storage device 80. The stored image can then be displayed on a cathode ray tube 82 or the like.

The fringe families produced in the final image of the illuminated object section differ somewhat in holography and shearography. In holography the fringe lines are arrayed as a function of contours of constant displacement while in shearography the fringe lines are contoured as a function of loci of constant in-plane shear strain on the surface of the object being tested. FIG. 4 illustrates a shearogram which results from the shearographic double exposure interferometric analysis of a tire section using the present invention. The double bullseye, butterfly-like patterns displayed on the image reveal the present defects in the tires. The fringe lines 86 reveal belt separations while the fringe lines 88 highlight inner ply separation and the fringe lines 90 represent porosity caused by under-cure of the tire.

I claim

1. A method of detecting structural anomalies in an article comprising the steps of:
   subjecting the article to a sudden and significant change in ambient pressure so that a surface of the article is caused to progressively creep for a prolonged period of time following the pressure change; and
   during said prolonged period of time while the article continues to progressively creep, forming a successive series of double exposures on a photosensitive media of coherent light respectively reflected from each of several sections of said article surface, whereby to provide interference patterns on said photosensitive media for each of said several sections during one ambient pressure change.

2. The method according to claim 1 wherein:
   during each exposure of each double exposure of coherent light reflected from each article surface section the photosensitive media is illuminated with a reference beam of light coherent with said reflected light to form a hologram; and
   said method includes the further step of reconstructing images of said article surface sections by illuminating each hologram with a beam of coherent reconstructing light.

3. The method according to claim 1 wherein:
   said article is elastomeric and is disposed within a sealed pressure chamber;
   said sudden and significant change in ambient pressure comprises suddenly reducing the pressure in said chamber from near atmospheric to a pressure significantly below atmospheric; and
   the series of double exposures are performed in rapid succession after said sudden change in ambient pressure so as to be completed before the article ceases creeping as a result of the sudden pressure change.

4. The method according to claim 1 wherein:
   the reflected light recorded on the photosensitive media during each exposure of each double exposure is focused in such a way as to provide a pair of images of the respective article surface section slightly displaced and overlapping one another on the photosensitive media.

* * * * *